United States Patent [19]

Mueller-Tamm et al.

[11] 3,925,341

[45] Dec. 9, 1975

[54] PROCESS FOR WORKING UP PARTICULATE POLYOLEFINS OBTAINED BY POLYMERIZATION CARRIED OUT WITH THE AID OF ZIEGLER/NATTA CATALYSTS

[75] Inventors: Heinz Mueller-Tamm, Ludwigshafen; Hannes Schick, Mannheim; Wolfgang Rau, Heidelberg; Peter Hennenberger, Ludwigshafen, all of Germany

[73] Assignee: BASF Aktiengesellschaft, Ludwigshafen (Rhine), Germany

[22] Filed: Nov. 26, 1973

[21] Appl. No.: 419,060

[30] Freign Application Priority Data

Nov. 29, 1972 Germany.................... 2258345

[52] U.S. Cl. .......... 260/93.7; 260/23 H; 260/45.85; 260/94.9 F
[51] Int. Cl.² ..................... C08F 6/00; C08F 6/28
[58] Field of Search ..................... 260/94.9 F, 93.7

[56] References Cited
UNITED STATES PATENTS

| 2,974,132 | 3/1961 | Jacobi | 260/94.9 F |
|---|---|---|---|
| 3,037,011 | 5/1962 | Leibson et al. | 260/93.7 |
| 3,244,688 | 5/1966 | Goins | 260/94.9 F |
| 3,258,456 | 6/1966 | Nelson | 260/94.9 F |
| 3,436,386 | 4/1969 | Harris | 260/94.9 F |
| 3,520,866 | 7/1970 | Bacskai | 260/93.7 |
| 3,773,743 | 11/1973 | Ainsworth et al. | 260/94.9 F |

*Primary Examiner*—Stanford M. Levin
*Attorney, Agent, or Firm*—Johnston, Keil, Thompson & Shurtleff

[57] ABSTRACT

A process for working up particulate polyolefins obtained by polymerization carried out with the aid of Ziegler/Natta catalysts. The process of the invention is characterized by a continuous, conventional operation (1) comprising the following integrated sub-stages: (1.1) introducing particulate polyolefin to a melting zone, (1.2) passing the molten polyolefin to a degassing zone, (1.3) transferring the degassed polyolefin to a discharge zone, and (1.4) finally extruding and granulating the resulting polyolefin; and by an important, additional and new feature (2) comprising the addition of an alkenoxide, water and optionally nitrogen to the polyolefin immediately before it passes to the melting zone or while it is in the melting zone. This process makes it possible to produce granular polyolefins of low halogen content in a particularly simple manner.

7 Claims, No Drawings

PROCESS FOR WORKING UP PARTICULATE POLYOLEFINS OBTAINED BY POLYMERIZATION CARRIED OUT WITH THE AID OF ZIEGLER/NATTA CATALYSTS

The present invention relates to a process for working up particulate polyolefins obtained by polymerization carried out with the aid of Ziegler/Natta catalysts and having a particle diameter of less than 5 mm.

In the polymerization of olefins using Ziegler/Natta catalysts particulate polyolefins are usually obtained which have a certain content of catalyst components depending on the catalyst combination used and the polymerization conditions employed. Thus in virtually all polyolefins of this kind which have been produced on an industrial scale there is a relatively high content of halogen, particularly chlorine. This means that the polyolefins must be worked up to reduce the halogen content before they are used in the production of shaped articles, as otherwise they would produce relatively severe corrosion of the machines used for producing such shaped articles and also the properties of the shaped articles themselves would be impaired.

A particularly effective method of reducing the catalyst and halogen contents consists in dissolving the particulate polyolefins, hydrolyzing and precipitating the catalyst components, filtering this system, optionally with the use of filter aids, and reprecipitating the polyolefins from the filtered solution. This method is highly efficient but too expensive and thus uneconomical.

Another method of reducing the catalyst or halogen content which is frequently used consists in treating the particulate polyolefins with specific wash liquids. A drawback of this method is that it is again necessary to carry out an additional operation which can only be realized at relatively high cost involving additional equipment, utilities and feedstocks.

Other, simpler methods such as (a) the treatment of the particulate polyolefins in a softened state with aqueous/alkaline solutions in extruders or (b) treatment at elevated temperatures with sulfoxide in worm extruders have not been adopted industrially not only because corrosion is likely to occur in the machines used for such treatment [as in (a) for example] but also because the degree of dehalogenation is unsatisfactory [as in (b) for example] and the worked up polyolefins may suffer impairment of their desirable properties.

It is an object of the present invention to work up particulate polyolefins of the type under consideration, particularly particulate polyolefins obtained by dry (gas phase) polymerization, to form granules of said polyolefins with satisfactory reduction of their halogen content in a particularly simple, i.e. improved, manner, that is to say to produce the polyolefins in the form most usually required for conversion to shaped articles, during which working-up processes it may also be possible, if desired, to select specific working conditions so as to effect degradation of the polyolefins to reduce the molecular weight to a desired extent.

It has been found that this object may be achieved by (1) continuously converting the particulate polyolefins in a specific conventional manner to granules via the molten thermoplastic state and (2) treating the polyolefins during said operation (1) with alkenoxide, water and optionally nitrogen in a specific manner so as to reduce their halogen content.

Thus the present invention relates to a process for working up particulate polyolefins obtained by polymerization, particularly dry polymerization, with the aid of Ziegler/Natta catalysts and having a particle diameter of less than 5 mm, which process of the invention is characterized by 1. a continuous, conventional operation comprising the following sub-stages:
    1.1. introducing the particulate polyolefins to a melting zone where it is melted by raising its temperature from ambient temperature to from 170° to 430°C,
    1.2. passing the molten polyolefin to a degassing zone where the volatiles are driven off at a temperature of from 160° to 430°C by subjecting the melt to a vacuum of from 0.1 to 500 millibars,
    1.3. transferring the degassed polyolefin to a discharge zone where it is held at a temperature of from 160° to 360°C and, if desired, mixed with additives, and
    1.4. finally extruding and granulating the resulting polyolefin; and
2. adding a $C_{2-6}$ alkenoxide, water and optionally nitrogen to the polyolefin immediately before it reaches the melting zone or while it is in the melting zone, such addition being at a rate of from 3 to 50 parts of alkenoxide, from 0.5 to 20 parts of water and up to 10 parts of nitrogen per 1,000 parts of polyolefin, by weight.

This process is suitable for reducing the halogen content of polyolefin and in particular those based on $C_{2-8}$ alkenes(1), above all polypropylene. The maximum particle size (diameter) of the polyolefins is less than 5 mm and advantageously less than 1 mm.

The particulate polyolefins obtained by polymerization with the aid of Ziegler/Natta catalysts and to be used as starting materials in the present invention are conveniently particulate polyolefins. They are well known and may be obtained as such, i.e. without purifying treatment, for example by the methods proposed in German Published Application Nos. 1,217,071 and 2,139,182.

The particulate polyolefins may have halogen contents of up to about 5,000 ppm by weight and they usually have halogen contents of from about 50 to 500 ppm by weight. The process of the invention reduces the halogen contents to about 20 ppm by weight and usually to from about 20 to 40 ppm by weight.

The process itself may be carried out using well-known and conventional granulating extruders equipped with a melting zone, degassing zone and discharge zone. Such extruders are commercially available and require no further explanation. Neither are the processing parameters, except for the addition of alkenoxide, water and optionally nitrogen, subject to any special conditions. In may be mentioned, however, that the use of higher temperatures and/or prolonged residence times can produce degradation of the polymer. Suitable procedures and equipment are described for example in Kunststoffe, Vol. 58 (1968), No. 6, pp. 394 to 402; Kunststofftechnik 7 (1968), No. 12, pp. 425 to 429; Plastverarbeiter 20 (1969/4), pp. 229 to 233; Plastverarbeiter 20 (1969/5), pp. 347 to 351; Chemie-Ing.-Technik 42 (1970), No. 1, pp. 41 to 44; Gummi, Asbest, Kunststoffe 11 (1970), pp. 1,234 to 1,240; Gummi, Asbest, Kunststoffe 12 (1970), pp. 1,361 to 1,374 and Kunststofftechnik 10 (1971), No. 10, pp. 345 to 351.

The important feature of the process of the invention is that a $C_{2-6}$ alkenoxide, preferably propenoxide, water and optionally nitrogen are added to the polyolefin immediately before it reaches the melting zone or while it is in the melting zone at a rate such that from 3 to 50 and preferably from 10 to 15 parts of alkenoxide, from 0.5 to 20 and preferably from 1 to 5 parts of water and up to 10 parts and preferably from 2 to 4 parts of nitrogen are added per 1,000 parts of polyolefin, by weight. The addition of said three materials is preferably carried out separately, but it is also possible to effect said addition in the form of binary or ternary mixtures of said materials. The apparatus employed for adding said materials may be the same as that normally used for adding liquid or gaseous auxiliary media in a granulating extruder of the present type immediately upstream of or in the melting zone. In our process the use of, say, metering pumps or flow meters has been found to be successful.

Since relatively large quantities of volatiles are driven off in the degassing zone in the process of the invention, it is necessary to ensure that the apparatus used for producing the vacuum has a sufficiently large capacity in order to provide a vacuum of from 0.1 to 500 millibars in the degassing zone.

EXAMPLE 1

The starting material used is a particulate polypropylene obtained by dry polymerization using a Ziegler/Natta catalyst and having a chlorine content of 400 ppm by weight derived from catalyst components and having an average particle size (diameter) of 0.4 mm, the maximum particle size being less than 1 mm.

The apparatus used is a commercial granulating extruder having a melting zone, a degassing zone and a discharge zone, three inlets to the melting zone being provided for alkenoxide, water and nitrogen respectively.

The extruder is operated in such a manner that a continuous integrated operation is carried out consisting in the introduction of the particulate polypropylene to the melting zone where its temperature is raised from ambient temperature to a temperature of about 250°C to cause melting thereof, whereupon the molten polypropylene is passed to the degassing zone where it is held at a temperature of about 250°C and subjected to a vacuum of about 20 millibars to drive off volatiles, the degassed polypropylene then being transferred to the discharge zone where it is maintained at a temperature of about 220°C before it is finally discharged by extrusion followed by granulation.

While the extruder is in operation, propenoxide, water and nitrogen are fed to the polypropylene in the melting zone at a rate of 10 parts of propenoxide, 3 parts of water and 2 parts of nitrogen per 1,000 parts of polypropylene, by weight.

There is thus obtained a granular polypropylene having a chlorine content of 20 ppm by weight.

EXAMPLE 2

Example 1 is repeated with the following modifications:

a. The extruder used is one having two inlets for alkenoxide and water respectively immediately upstream of the melting zone.
b. While the extruder is in operation, propenoxide and water are added to the polypropylene immediately upstream of the melting zone at a rate of 15 parts of propenoxide and 5 parts of water per 1,000 parts of polypropylene, by weight.
c. To the polypropylene in the discharge zone of the extruder there are added 1 part of n-octadecyl β-(3,5-di-t-butyl-4-hydroxyphenyl)-propionate and 1 part of calcium stearate per 1,000 parts of polypropylene to act as stabilizers (thermostabilizers, processing stabilizers and color stabilizers).

There is thus obtained a granular polypropylene having a chlorine content of 25 ppm by weight.

We claim:

1. A process for working up particulate polyolefins in an extruder, said particulate polyolefins having been obtained by gas phase polymerization with the aid of Ziegler/Natta catalysts and having a particle diameter of less than 5 mm, said process consisting essentially of:
   a. continuously introducing said particulate polyolefin into a melting zone wherein sufficient heat is applied to melt said polyolefin;
   b. adding to said particulate polyolefin before it reaches said melting zone or within said melting zone,
      1. a $C_2$-$C_6$ alkenoxide, and
      2. water,
      the amount of said alkenoxide being from 3 to 50 parts by weight per 1,000 parts of polyolefin and the amount of water being from 0.5 to 20 parts by weight per 1,000 parts of polyolefin;
   c. passing said molten polyolefin to which said oxide and said water have been added to a degassing zone wherein volatiles are driven off under a vacuum of from 0.1 to 500 millibars to substantially reduce the halogen content of said polyolefin;
   d. transferring the degassed polyolefin to a discharge zone; and thereafter,
   e. extruding and granulating the resulting polyolefin.

2. The process as set forth in claim 1 wherein up to 10 parts of nitrogen per 1,000 parts of polyolefin, by weight, are additionally added to said polyolefin immediately before it reaches the melting zone or while it is in the melting zone.

3. The process as set forth in claim 1 wherein said alkeneoxide is propene oxide.

4. The process as set forth in claim 3 wherein said polyolefin is a propylene polymer.

5. The process as set forth in claim 11 wherein the temperature in the degassing zone is from 160° to 430°C.

6. The process as set forth in claim 5 wherein the amount of alkene oxide added to said polyolefin is from 10 to 15 parts by weight per 1,000 parts of polyolefin and the amount of water is from 1 to 5 parts by weight per 1,000 parts of polyolefin.

7. The process as set forth in claim 5 wherein said particles have a diameter of less than 1 mm.

* * * * *

UNITED STATES PATENT AND TRADEMARK OFFICE
CERTIFICATE OF CORRECTION

PATENT NO. : 3,925,341
DATED : December 9, 1975
INVENTOR(S) : MUELLER-TAMM et al It is certified that error appears in the above-identified patent and that said Letters Patent are hereby corrected as shown below:

In Column 4, Claim 5, delete " The process as set forth in Claim 11 ... " and substitute -- The process as set forth in Claim 1 ... --

Signed and Sealed this

Twenty-first Day of September 1976

[SEAL]

Attest:

RUTH C. MASON
*Attesting Officer*

C. MARSHALL DANN
*Commissioner of Patents and Trademarks*